US012687671B1

(12) United States Patent (10) Patent No.: US 12,687,671 B1
Young et al. (45) Date of Patent: Jul. 21, 2026

(54) HOLOGRAPHIC STRAY LIGHT SUPPRESSION

(71) Applicant: Apple Inc., Cupertino, CA (US)

(72) Inventors: Michael Young, Broomfield, CO (US); Daniel Ott, Boulder, CO (US); Maria I Campana, Boulder, CO (US); Chuan Luo, Broomfield, CO (US); Adam C Urness, Boulder, CO (US); Scott M DeLapp, San Diego, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 18/631,988

(22) Filed: Apr. 10, 2024

Related U.S. Application Data

(60) Provisional application No. 63/495,351, filed on Apr. 11, 2023.

(51) Int. Cl.
| | |
|---|---|
| *G02B 5/32* | (2006.01) |
| *G02B 27/01* | (2006.01) |
| *G03B 17/17* | (2021.01) |
| *H04N 23/75* | (2023.01) |

(52) U.S. Cl.
CPC ........... *G02B 5/32* (2013.01); *G02B 27/0103* (2013.01); *G03B 17/17* (2013.01); *H04N 23/75* (2023.01)

(58) Field of Classification Search
None
See application file for complete search history.

(56) References Cited

U.S. PATENT DOCUMENTS

| | | | |
|---|---|---|---|
| 2021/0088796 A1* | 3/2021 | Ayres | G02F 1/295 |
| 2021/0247610 A1 | 8/2021 | Bhakta et al. | |
| 2021/0405380 A1 | 12/2021 | Urness et al. | |
| 2022/0004006 A1 | 1/2022 | Pfeiffer et al. | |
| 2023/0408826 A1* | 12/2023 | Oh | G02F 1/1368 |

FOREIGN PATENT DOCUMENTS

| WO | 2020205101 A1 | 10/2020 | |
| WO | WO-2024026209 A1 * | 2/2024 | G02B 27/0172 |

OTHER PUBLICATIONS

U.S. Appl. No. 17/898,142, filed Aug. 29, 2022.

* cited by examiner

*Primary Examiner* — James M Hannett
(74) *Attorney, Agent, or Firm* — Treyz Law Group, P.C.; Michael H. Lyons

(57) ABSTRACT

An electronic device may include a camera, a lens, and gratings overlapping the lens. The gratings may diffract a first portion of light incident from a first range of incident angles while transmitting a second portion of the light incident from a second range of incident angles. The lens may direct the second portion of the light to the camera. The gratings may diffract the first portion of the light away from the optics. The gratings may be homogenous or spatially varying. If desired, the gratings may diffract the first portion of the light into a waveguide that propagates the first portion of the light away from the optics. The first range of incident angles and/or the location of the gratings may be selected to remove stray light that would otherwise produce artifacts in the image data. The camera may be replaced with an eye box in augmented reality implementations.

19 Claims, 8 Drawing Sheets

HOLOGRAPHIC STRAY LIGHT SUPPRESSION

This application claims the benefit of U.S. Provisional Patent Application No. 63/495,351, filed Apr. 11, 2023, which is hereby incorporated by reference herein in its entirety.

BACKGROUND

This disclosure relates to electronic devices such as electronic devices with optical sensors.

Electronic devices often include optical sensors such as cameras for capturing images in response to light. Optical components such as lenses are often used to help direct the light towards an optical sensor. In practice, some of the light can be incident upon the optical components at high angles. If care is not taken, the light incident upon the optical components at high angles produces stray light, which can lead to undesirable artifacts or other non-idealities in the images captured by the optical sensor.

SUMMARY

An electronic device may include an optical sensor such as a camera having an array of image sensor pixels. The electronic device may have optics such as a lens that directs light towards the optical sensor. The optical sensor may generate images from the light. A diffractive optical element (DOE) may be disposed overlapping the optics. The DOE may include gratings such as holograms.

The gratings may diffract a first portion of the light incident from a first range of incident angles while transmitting a second portion of the light incident from a second range of incident angles. The optics may direct the second portion of the light to the optical sensor. The gratings may diffract the first portion of the light away from the optics and/or towards a baffle. The gratings may be homogenous or spatially varying. For example, different gratings may be confined to different regions of the medium. If desired, the gratings may diffract the first portion of the light into a waveguide. The waveguide may propagate the first portion of the light away from the optics and/or towards a baffle. The first range of incident angles and/or the location of the gratings may be selected to remove stray light that would otherwise produce artifacts in the image data. This may allow for the removal of stray light artifacts at the optical sensor without increasing the size of the optics.

In some implementations, the optics may include a beam-translating prism. In some implementations, the optics may include a waveguide for directing image light and world light towards an eye box. The gratings may overlap the waveguide and may diffract stray light paths away from the eye box. In some implementations, the waveguide may have a folded prism input coupler. The gratings may be layered onto the folded prism input coupler for diffracting high angles of light from a projector away from the eye box. In some implementations, the gratings may diffract light incident from a single angle onto a single output angle or onto multiple output angles. In some implementations, different gratings in different regions of a medium may diffract different angles of incident light towards one or two optical stops.

DETAILED DESCRIPTION

Figure 1:
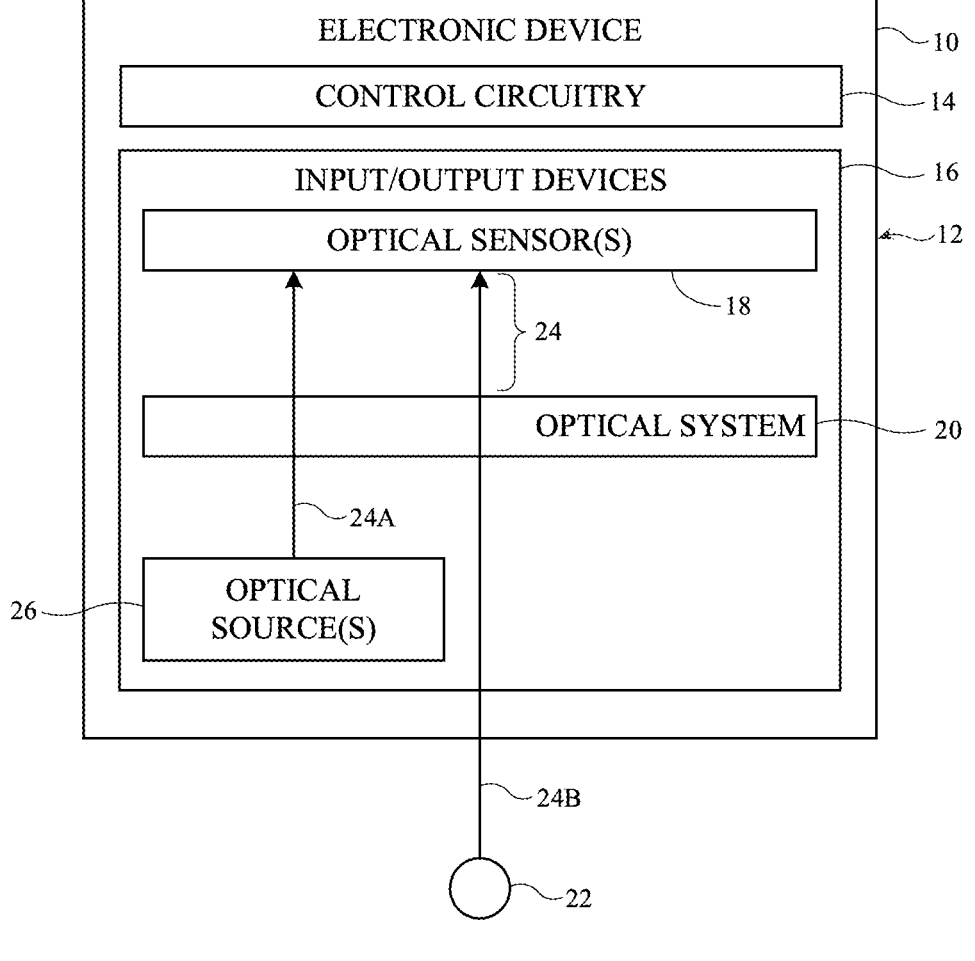
FIG. 1 is a diagram of an illustrative electronic device having an optical sensor in accordance with some embodiments.

An illustrative electronic device of the type that may be provided with an optical sensor is shown in FIG. 1. Electronic device 10 may be a photography device such as a camera (e.g., a digital camera such as a digital single-lens reflex (DSLR) camera or another camera device), a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device (e.g., an ear bud device), a virtual reality (VR) and/or augmented reality (AR) device (e.g., an AR/VR headset, glasses, or goggles), a device embedded in eyeglasses, sunglasses, or other equipment worn on a user's head, another wearable device, a display such as a computer display that contains an embedded computer, a display that does not contain an embedded computer, a gaming device, system, or controller, a navigation device, an embedded system such as a system in which electronic equipment with an optical sensor is mounted in a vehicle (e.g., an automobile) or kiosk, or other electronic equipment.

As shown in FIG. 1, electronic device 10 may have control circuitry 14. Control circuitry 14 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 14 may be used to control the operation of device 10. The processing circuitry may include one or more processors such as microprocessors, microcontrollers, graphics processing units (GPUs), central processing units (CPUs), digital signal processors, baseband processors, power management units, audio chips, application specific integrated circuits, etc.

Device 10 may also include input-output circuitry. The input-output circuitry may include one or more input-output devices 16. Input-output (IO) devices 16 may be used to allow data to be supplied to device 10 and/or to allow data to be provided from device 10 to external devices and/or a user. Input-output devices 16 may include, as examples, one or more displays (e.g., displays having integrated touch sensor and/or force sensor capabilities), force sensors, motion sensors, accelerometers, gyroscopes, inertial measurement units, orientation sensors, buttons, joysticks, scrolling wheels, touch pads, keypads, keyboards, microphones, speakers, tone generators, vibrators, sensors, light-emitting diodes and other status indicators, data ports, etc. A user may control the operation of device 10 by supplying commands through input-output devices 16 and/or may receive status information and other output from device 10 using the output resources of input-output devices 16.

Input-output devices 16 may include one or more optical sensors such as optical sensor 18. Optical sensor 18 may gather, generate, produce, measure, or otherwise output optical sensor data in response to light 24 incident upon or received by optical sensor 18. Optical sensor 18 may include, for example, one or more image sensors (e.g., a camera). The image sensor(s) in optical sensor 18 may include one or more image sensor pixels (e.g., photodiodes and/or other components or circuitry that generate electrical signals in response to incident photons of light). The image sensor(s) may, for example, generate optical sensor data (e.g., image sensor data, sometimes referred to herein simply as sensor data) that includes images or videos (e.g., a sequence of image frames) captured from incident light 24. If desired, optical sensor 18 may be provided with one or more apertures and/or one or more shutters that selectively pass light 24 to the image sensor pixels in optical sensor 18.

Optical sensor 18 may provide the generated optical sensor data to control circuitry 14 for display on a display in input-output devices 16 (e.g., for viewing by a user), for storing in memory on device 10, for wireless transmission to an external device or accessory device, for upload to the internet or a cloud storage provider, for providing as an input to one or more applications executed by control circuitry 14, etc. Input-output devices 16 and control circuitry 14 may be mounted within and/or on a housing 12 for device 10. Housing 12 may include metal housing portions and/or dielectric housing portions.

Input-output devices 16 may include an optical system such as optical system 20. Optical system 20 may help to provide light 24 to optical sensor 18. Optical system 20 may, for example, include optics that direct, redirect, focus, propagate, operate on, and/or transmit light 24 towards active portion(s) of optical sensor 18. The active portion(s) of optical sensor 18 may generate optical sensor data in response to the light 24 received from the optics in optical system 20. If desired, the optics may add optical power to light 24 (e.g., to help magnify or focus light 24 onto pixels of optical sensor 18), may distort light 24 (e.g., to correct for other optical distortions, non-ideal wavefront shapes, or aberrations introduced to light 24), and/or may otherwise operate on light 24 in providing light 24 to optical sensor 18.

The light 24 captured by optical sensor 18 may include real-world light 24B (sometimes referred to herein as world light, external light, environmental light, or ambient light) from real-world (external) objects such as objects 22. Objects 22 may include emissive objects such as an external light source (e.g., artificial lights, the sun, etc.) and/or may include reflective objects that reflect light from an external light source towards device 10. Optical system 20 may direct or redirect world light 24B towards optical sensor 18. Optical sensor 18 may generate optical sensor data in response to world light 24B (e.g., optical sensor 18 may capture or generate images of objects 22 in the scene in front of or around device 10).

Additionally or alternatively, the light 24 captured by optical sensor 18 may include device-generated light 24A. Device-generated light 24A may be emitted, produced, or output by one or more optical sources 26 on or in device 10. Optical source 26 may include one or more light sources. Optical source 26 may include, for example, a display in input-output devices 16 (e.g., a display having an array of display pixels that emit display light that forms some or all of device-generated light 24A) or another light source in input-output devices 16. Optical system 20 may direct or redirect device-generated light 24A towards optical sensor 18. Optical sensor 18 may generate optical sensor data in response to device-generated light 24A (e.g., optical sensor 18 may capture or generate images of the light emitted by optical source(s) 26).

If desired, optical system 20 may include one or more optical components (e.g., optical couplers, waveguides, mirrors, lenses, prisms, optical wedges, beam splitters, etc.) that direct device-generated light 24A towards another device, the user of device 10, or objects 22 for reflection back towards optical sensor 18 as reflected device-generated light (e.g., device-generated light 24A may include reflected light if desired). Optical system 20 may direct the reflected device-generated light towards optical sensor 18 within light 24.

As example, optical sensor 18 may be a camera that captures images of objects 22 in front of or around device 10. The camera may be a front-facing camera or a rear-facing camera, as examples. In implementations where device 10 is a head-mounted device, optical sensor 18 may include an inward-facing camera or an outward facing camera. In these implementations, input-output devices 16 may include one or more near-eye displays mounted within a housing 12 (sometimes referred to herein as support structure 12). An inward-facing camera may face the user while wearing device 10 on their head. An outward-facing camera may face the scene in front of the user while wearing device 10 on their head.

Housing 12 may have the shape of a pair of eyeglasses or goggles (e.g., supporting frames), may form a housing having a helmet shape, or may have other configurations to help in mounting and securing the components of the near-eye displays on the head or near the eye of a user. The near-eye displays may include one or more display projectors. The display projectors may include emissive display panels (e.g., uLED panels, laser-based display panels, etc.), transmissive spatial light modulators (e.g., transmissive liquid crystal display (LCD) panels), reflective spatial light modulators (e.g., digital micromirror device (DMD) panels, liquid crystal on silicon (LCOS) panels, etc.), or other display optics. Each projector may emit device-generated light 24A containing images of virtual (computer-generated) objects (sometimes referred to herein as image light). Portions of optical system 20 may redirect the image light towards a user's eyes at one or two eye boxes of the near-eye displays. The image light may be, for example, visible light (e.g., including wavelengths from 400-700 nm) that contains and/or represents something viewable such as a scene or object (e.g., as modulated onto the image light using the image data provided by the control circuitry to the display module).

Optical system 20 may form lenses that allow a viewer (e.g., a user's eyes at the eye box(s)) to view images on the near-eye display(s). A single display may produce images for both eyes or a pair of displays may be used to display images. In configurations with multiple displays (e.g., left and right eye displays), the focal length and positions of the lenses formed by optical system 20 may be selected so that any gap present between the displays will not be visible to a user (e.g., so that the images of the left and right displays overlap or merge seamlessly).

If desired, optical system 20 may contain components (e.g., an optical combiner, etc.) to allow world light 24B to be optically combined with virtual (computer-generated) images such as virtual images in the image light (e.g., device-generated light 24A). In this type of system, which is sometimes referred to as an augmented reality (AR) system, a user of device 10 may view both real-world content (e.g., world light 24B from objects 22) and computer-generated content that is overlaid on top of the real-world content. Camera-based augmented reality systems may also be used in device 10 (e.g., in an arrangement in which a camera such as a camera in optical sensor(s) 18 captures real-world images of objects 22 and this content is digitally merged with virtual content at optical system 20).

If desired, optical sensor 18 may generate optical sensor data associated with a user's eyes at the eye boxes of the near-eye displays. For example, optical sensor 18 and optical source(s) 26 may form a gaze tracking sensor that gathers optical sensor data such as gaze image data (gaze tracking image data or gaze tracking sensor data) from a user's eyes at the eye boxes of the near-eye displays. Control circuitry 14 may process the optical sensor data to identify and track the direction of the user's gaze in real time. Control circuitry 16 may perform any desired operations based on the tracked direction of the user's gaze over time.

In implementations where optical source(s) 26 and optical sensor 18 form a gaze tracking sensor, optical source(s) 26 may include one or more infrared emitters and optical sensor(s) 18 may include one or more infrared receivers (sensors). The infrared emitter(s) may include one or more light sources that emit sensing light in device-generated light 24A. The sensing light may be used for performing optical sensing on/at the eye boxes (e.g., gaze tracking) rather than conveying pixels of image data such as in the image light generated by the projector(s). The sensing light in device-generated light 24A may include infrared light at infrared (IR) wavelengths and/or near-infrared (NIR) wavelengths (e.g., any desired wavelengths from around 700 nm to around 10 um). The sensing light may additionally or alternatively include wavelengths less than 700 nm if desired.

The infrared emitter(s) may direct the sensing light towards optical system 20. Optical system 20 may direct the sensing light emitted by the infrared emitter(s) towards the eye boxes. The sensing light may enter the user's eye at eye box and may reflect off portions (regions) of the user's eye (e.g., the user's retina, iris, and cornea) as reflected sensing light (sometimes referred to herein as reflected sensing light or a reflected version of the sensing light). Optical system 20 may receive the reflected sensing and may direct the reflected sensing light towards the infrared sensor(s) in optical sensor(s) 18 (e.g., as reflected device-generated light 24A). The infrared sensor(s) may receive the reflected sensing light from optical system 20 and may gather (e.g., generate, measure, sense, produce, etc.) optical sensor data in response to the received reflected sensing light.

In sum, the light 24 provided to optical sensor 18 for generating optical sensor data may include world light 24B and/or device-generated light 24A. World light 24B may include visible light and/or infrared light. Device-generated light 24A may include visible light (e.g., visible light containing images) and/or infrared light (e.g., reflected infrared light for use in performing gaze tracking). If desired, control circuitry 14 may calibrate optical source(s) 26 based on visible light in device-generated light 24A. For example, in implementations where device 10 is a head-mounted device and device-generated light 24A includes visible light, control circuitry 14 may identify and process a calibration pattern in device-generated light 24A to identify and correct for misalignments between two or more optical components in input-output devices 16 (e.g., by controlling optical source(s) 26 to distort subsequently displayed image data and/or by mechanically adjusting one or more components in device 10).

Device 10 need not be a head-mounted device. In general, optical sensor 18 may include any desired camera for capturing images in response to world light 24B and/or device-generated light 24A (e.g., directly or after reflection off an object 22, a user, or another object), an ambient light sensor, a lidar sensor (e.g., an optical sensor for use in detecting the range between device 10 and objects 22 using emitted light that is reflected off objects 22 and received back at device 10), an infrared sensor for capturing infrared light generated by optical source(s) 26 (e.g., in device-generated light 24A) and/or in world light 24B (e.g., an infrared sensor that captures images of infrared light emitted by optical source(s) 26 and reflected off external objects 22 for range detection or facial recognition purposes), or any other desired optical sensor that generates optical sensor data in response to world light 24B and/or device-generated light 24A.

Figure 2:
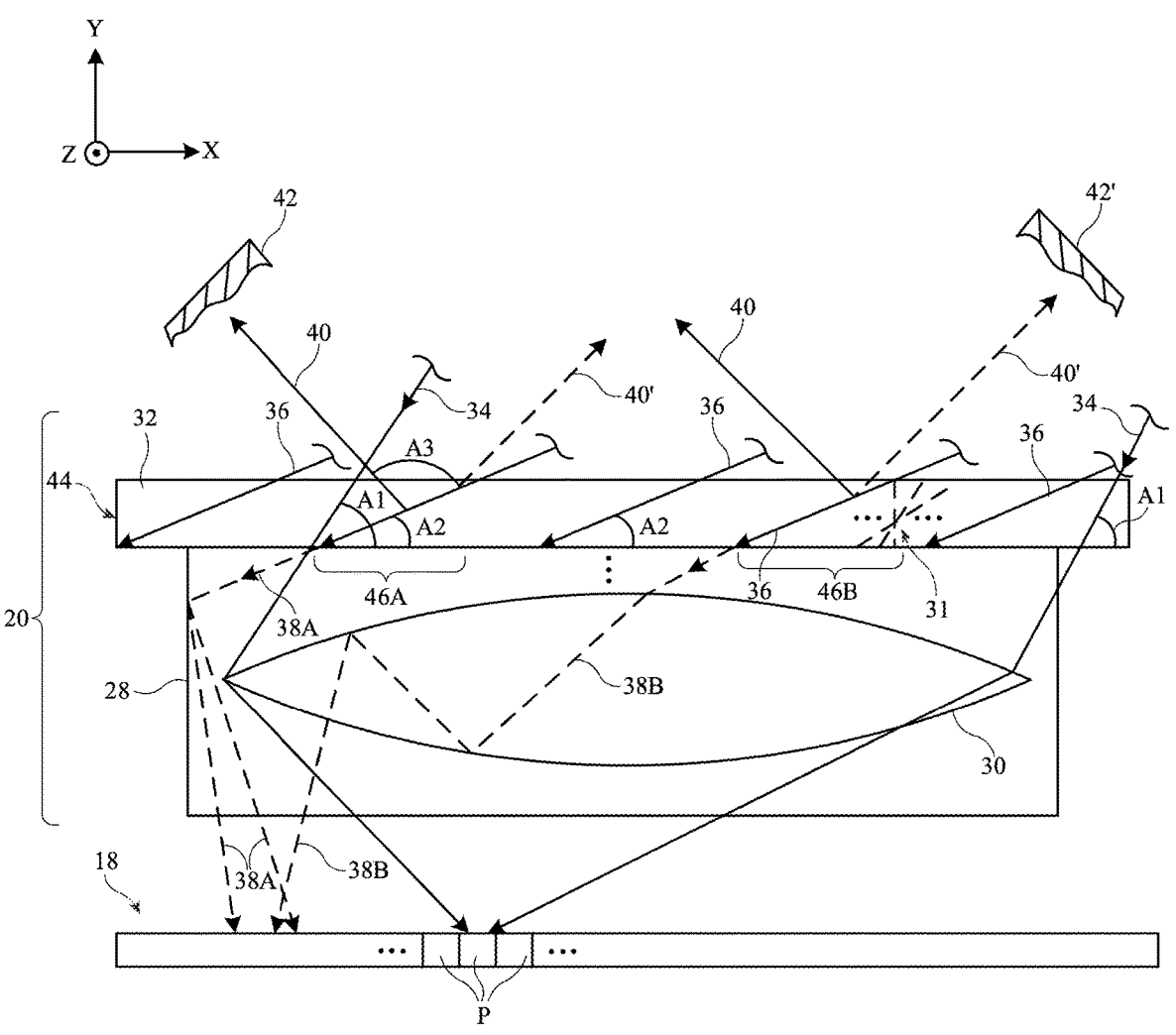
FIG. 2 is a cross-sectional side view of an illustrative optical system that includes holograms for mitigating stray light at an optical sensor in accordance with some embodiments.

FIG. 2 is a cross-sectional side view showing how optical system 20 may provide light 24 to optical sensor 18. As shown in FIG. 2, optical system 20 may include optics 28. Optics 28 may include one or more lenses 30 (sometimes referred to herein as lens elements), optical wedges, optical combiners, optical prisms, beam splitters, mirrors, and/or any other desired optical components that direct light 24 towards the pixels P of optical sensor 18.

Light 24 may be incident upon optics 28 over a range of incident angles. For example, light 24 may be incident at relatively low angles with respect to the optical axis of optics 28 (e.g., at relatively high angles A1 with respect to the X-Z axis of FIG. 2), as shown by rays 34. Optics 28 (e.g., lens(es) 30) may focus this on-axis light 24 (sometimes referred to herein as signal light 24) onto desired pixels P of optical sensor 18, which generates optical sensor data in response to the incident light.

However, some of light 24 may be incident at relatively high angles with respect to the optical axis of optics 28 (e.g., at relatively low angles A2 with respect to the X-Z axis), as shown by rays 36. Optics 28 may be unable to direct this off-axis light 24 onto desired pixels P of optical sensor 18. For example, some of this high angle light that is incident within certain portions of the aperture of optics 28 may not hit lens(es) 30 at all, producing stray light 38A that can reach undesired pixels P of optical sensors 18. Stray light 38A may, for example, reflect off one or more surfaces of optics 28, off a housing, frame, fixture, enclosure, barrel, or support for lens(es) 30, may scatter undesirably at one or more surfaces within optics 28, etc. As another example, some of the high angle light incident within other portions of the aperture can pass into lens(es) 30 but may undesirably propagate via total internal reflection instead of passing to optical sensor 18 (e.g., as stray light 38B). Other sources of stray light may also be present (e.g., veiling glare, higher order diffraction from other diffractive surfaces, etc.).

If care is not taken, stray light 38A and 38B (sometimes referred to collectively herein as stray light 38) may cause optical sensor 18 to generate undesirable optical sensor data at undesired pixel positions. This may produce distracting visible artifacts such as ghost images or veiling glare in the captured optical sensor data and may undesirably limit the contrast of the captured optical sensor data. If desired, optics 28 and lenses 30 may be increased in size to minimize the production of stray light. However, it may be desirable to minimize the size of optics 28 and thus the bulkiness and weight of device 10, which is particularly important when device 10 has a small form factor or is worn on a user's head.

To eliminate stray light 38 without increasing the size of optics 28, optical system 20 may include a diffractive optical element (DOE) 32 overlapping optics 28. DOE 32 is relatively compact, lightweight, and may serve as a filter for stray light 38 with minimal effect to the transmission of on-axis light (see, e.g., rays 34, which do not produce stray light 38), thereby allowing optical sensor 18 to gather high contrast optical sensor data that is free from stray light artifacts.

DOE 32 may include one or more diffractive gratings in one or more layers of grating media such as grating medium 44 (sometimes referred to herein as holographic medium 44, grating medium 44, holographic recording medium 44, or diffraction grating medium 44). The diffractive grating(s) in DOE 32 may be recorded or written in grating medium 44 (e.g., as holographic phase gratings, sometimes referred to herein as holograms, as surface relief gratings, etc.). DOE 32 may sometimes also be referred to herein as diffractive grating structures 32.

The diffractive grating(s) in DOE 32 may, if desired, include a set of one or more holograms recorded in grating medium 44 (e.g., volume phase holograms (VPH), sometimes referred to herein simply as volume holograms). A hologram (holographic recording) may be stored as an optical interference pattern (e.g., alternating regions of different indices of refraction) within a photosensitive optical material such as grating medium 44. Each hologram may have a corresponding set of planes (lines or fringes) 31 of constant refractive index in grating medium 44. Each hologram may be defined in momentum space (e.g., k-space) by a corresponding grating vector. The grating vector may have a spatial orientation associated with the direction and angle of the planes of constant refractive index (e.g., the grating vector may be oriented in a direction orthogonal to the planes of constant refractive index). The grating vector may have a magnitude (sometimes referred to as grating frequency) associated with the wavelength of light diffracted by the corresponding hologram. Each hologram in DOE 32 may have a different respective grating vector and may be recorded (superimposed) within the same volume of grating medium 44 if desired. The grating vector may also characterize the Bragg-matching condition of the corresponding hologram. In other words, each hologram may diffract light of the wavelength corresponding to the magnitude of its grating vector from a corresponding incident angle onto a corresponding output (diffracted) angle, as given by the orientation of the grating vector.

The gratings in DOE 32 may be non-switchable diffractive gratings that are encoded with a permanent interference pattern or may be switchable diffractive gratings in which the diffracted light can be modulated by controlling an electric field applied to the holographic recording medium. Multiple holographic phase gratings (holograms) may be recorded within (e.g., superimposed within) the same volume of holographic medium if desired. Grating medium 44 may include photopolymers, gelatin such as dichromated gelatin, silver halides, holographic polymer dispersed liquid crystal, or other suitable holographic media. If desired, grating medium 44 may be layered onto an optically transparent substrates or may be sandwiched between two optically transparent substrates.

More generally, the diffractive gratings in DOE 32 may include holographic phase gratings such as volume holograms or thin-film holograms, meta-gratings (e.g., gratings formed from patterns of meta-materials such as metal or dielectric patches of different shapes), surface relief gratings (SRGs) (e.g., modulations in thickness of grating medium 44 formed from etching or cutting troughs and peaks into a surface of grating medium 44), or any other desired diffractive grating structures. The diffractive gratings in DOE 32 may, for example, include multiple multiplexed gratings (e.g., holograms) that at least partially overlap within the same volume of grating medium (e.g., for diffracting different colors of light and/or light from a range of different input angles at one or more corresponding output angles). If desired, grating medium 44 may be layered onto an optical face of optics 28 (e.g., onto a surface of one or more lenses 30 facing away from optical sensor 18, onto a transparent cover layer for optics 28, onto a housing or barrel for optics 28, etc.). Alternatively, grating medium 44 may be spaced apart from optics 28, may be interposed between different lenses 30 in optics 28, or may be disposed between optics 28 and optical sensor 18.

Light 24 may be incident upon DOE 32. The grating(s) (hologram(s)) in DOE 32 may diffract light 24 incident from angles that would otherwise produce stray light 38 (e.g., the light 24 shown by rays 36 and incident at angles A2) without diffracting light 24 incident at other angles (e.g., the light 24 shown by rays 30 and incident at angles A1 for transmission to optical sensor 18). If desired, DOE 32 may diffract this light towards an optical stop 42 (e.g., a non-reflective/blackened baffle or absorber) to help prevent stray light from scattering elsewhere in device 10. For example, DOE 32 may include holograms that are configured (e.g., Bragg matched) to diffract light incident from angles A2 onto output (diffracted) angles A3 (e.g., as measured relative to the incident direction of propagation) oriented away from optics 28 and/or towards optical stop 42, thereby removing the light from the system and preventing stray light from reaching optical sensor 18.

At the same time, since DOE 32 does not include gratings (holograms) that are Bragg matched to the desired signal light 24 associated with rays 34, DOE 32 may transmit the desired signal light 24 associated with rays 34 to optics 30 without diffracting or redirecting the signal light. Optics 30 may then direct the signal light 24 associated with rays 34 to the corresponding pixels P on optical sensor 18. Optical sensor 18 may thereby generate optical sensor data free from artifacts from stray light 38. The gratings (holograms) in DOE 32 may be configured to cover the range of wavelengths of light 24 that optical sensor 18 is sensitive to (e.g., visible wavelengths, R/G/B wavelengths, IR wavelengths, etc.). This may be achieved by utilizing a very narrow diffractive element with wide angle and wavelength selectivity, or by multiplexing multiple holograms.

For example, optical sensor 18 may be sensitive to a range of wavelengths R (e.g., may generate optical sensor data in response to light 24 of wavelengths R). Each hologram in the set of multiplexed (superimposed) holograms in DOE 32 be configured (e.g., through appropriate recording in grating medium 44) to diffract light 24 of a different respective wavelength from range R and incident from a different respective angle within a range of angles A1 that would otherwise produce stray light 38 onto output angle A3 (or onto a different respective output angle oriented away from optics 28). This may serve to prevent stray light 38 from reaching optical sensor 18 and producing undesirable artifacts in the optical sensor data, without increasing the size or weight of optical system 20.

The gratings in DOE 32 may include transmissive gratings (e.g., transmissive holograms) that diffract incident light onto an output angle less than 90 degrees from the propagation direction of the incident light (as shown by rays 40) or may, if desired, include reflective gratings (e.g., reflective holograms) that diffract incident light onto an output angle more between 90-180 degrees from the propagation direction of the incident light (as shown by rays 40' oriented towards optical stop 42'). If desired, DOE 32 may include both transmissive gratings and reflective gratings. If desired, DOE 32 may include transmissive gratings in some regions of grating medium 44 and reflective gratings in other regions of grating medium 44. If desired, two or more of the gratings in DOE 32 may be distributed across multiple stacked layers of grating medium 44 (e.g., the gratings in DOE 32 need not be superimposed within the same volume of grating medium).

If desired, the gratings (holograms) in DOE 32 may be spatially homogenous across the lateral area of grating medium 44 (e.g., within the X-Z plane). In other words, the gratings may uniformly extend across the entire lateral area of grating medium 44. In other suitable implementations, the gratings (holograms) in DOE 32 may be spatially varying (e.g., may have a grating strength or diffraction efficiency that varies across the lateral area of grating medium 44). For example, the gratings may be laterally confined within only one or more lateral regions 46 within grating medium 44. The regions of grating medium 44 outside of regions 46 may be free of diffractive gratings or may have diffractive gratings with a grating strength or diffraction efficiency less than a threshold grating strength or diffraction efficiency. If desired, grating medium 44 may include a different material outside of regions 46 than within regions 46 or may include a single layer of the same material but having gratings recorded only within regions 46. For example, an opaque mask may be used during recording to prevent gratings from being written outside of regions 46.

The regions 46 of grating medium 44 having diffractive gratings may, for example, overlap problematic portions of optics 28 that would otherwise produce stray light 38 in the absence of DOE 32. The gratings in each region 46 may be recorded to redirect the corresponding incident angles of light 24 that would otherwise produce stray light at the position of that region 46. In other words, the gratings in different regions 46 may have different grating vectors as needed to meet the stray light suppression requirements of the system. For example, the gratings within region 46A of FIG. 2 may have grating vectors that configure the gratings to diffract light 24 that would otherwise produce stray light 38A (e.g., that would otherwise scatter or reflect off optical system 28 to produce artifacts in the optical sensor data) whereas the gratings within region 46B of FIG. 2 may have grating vectors that configure the gratings to diffract light 24 that would otherwise produce stray light 38B (e.g., that would otherwise totally internally reflect within lens 30 to produce artifacts in the optical sensor data). In general, there may be any desired number of regions 46A and/or 46B in DOE 32. Confining the gratings in DOE 32 to regions 46 may, for example, help to minimize the impact of DOE 32 on the signal light associated with rays 34.

Figure 3:
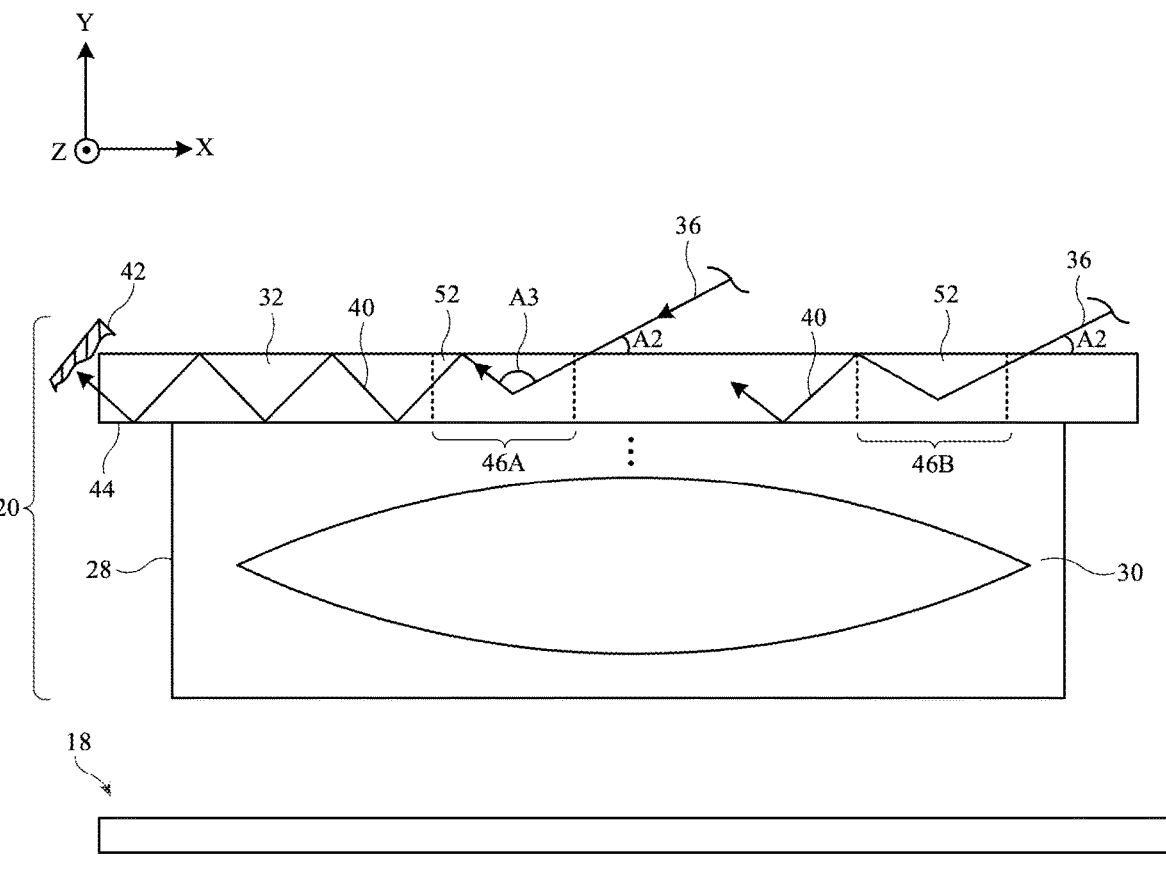
FIG. 3 is a cross-sectional side view of an illustrative optical system that includes holograms and a waveguide for mitigating stray light at an optical sensor in accordance with some embodiments.

In the example of FIG. 2, DOE 32 redirects (diffracts) light 24 into free space. If desired, DOE 32 may redirect (diffract) 24 into a waveguide that helps to propagate the light away from optical sensor 18. FIG. 3 is a diagram showing one example of how DOE 32 may diffract light 24 into a waveguide that helps to propagate the light away from optical sensor 18. As shown in FIG. 3, DOE 32 may include gratings (e.g., spatially homogenous gratings across DOE 32 and/or confined to one or more regions 46A/46B) that diffract light from incident angles A2 onto output angles A3 that lie within the total internal reflection (TIR) range of grating medium 44 (or the TIR range of a waveguide in which grating medium 44 is embedded or layered).

Grating medium 44 may, for example, have a higher refractive index than the material around grating medium 44 (e.g., air, optically clear adhesive, etc.). Light incident, from within grating medium, upon a surface of grating medium 44 at an angle within the TIR range of grating medium 44 will propagate along the length of grating medium 44 (e.g., parallel to the X-axis) via total internal reflection. In this way, grating medium 44 may serve as a waveguide that propagates the light away from optics 28 and optical sensor 18, preventing stray light 38 from reaching the sensor. If desired, optical stop 42 may be used to absorb the stray light upon exiting the grating medium.

Figure 4:
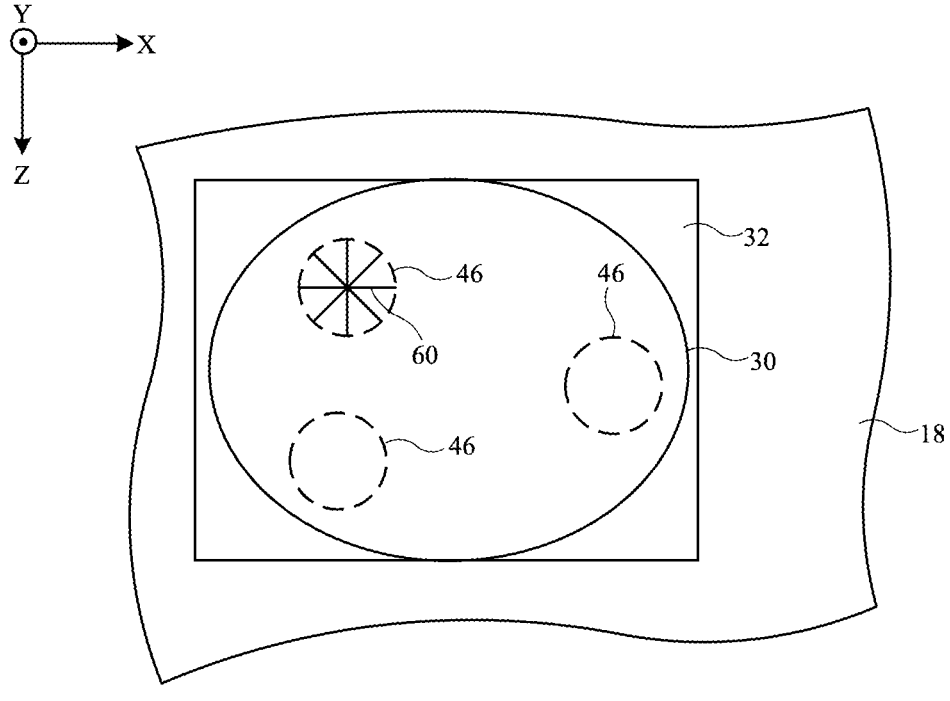
FIG. 4 is a top view of an illustrative optical system having different holograms overlapping different regions of an underlying optical sensor for mitigating stray light in accordance with some embodiments.

FIG. 4 is a top view (e.g., as taken in the −Y direction of FIG. 3) showing how DOE 32 may include different regions 46 across its lateral area. As shown in FIG. 4, DOE 32 may overlap lens(es) 30 in optics 28 and optical sensor 18. In implementations where DOE 32 includes spatially varying gratings, the gratings in DOE 32 may be confined within one or more regions 46 within the lateral area of DOE 32 (e.g., regions 46A and/or 46B of FIGS. 2 and 3). DOE 32 may include any desired number of one or more regions 46. Each region 46 may be placed at a location that is selected to prevent the formation of artifact-producing stray light given the geometry and configuration of optical system 20, optical sensor 18, and device 10.

If desired, the gratings in DOE 32 may exhibit rotational symmetry about the Y-axis with respect to the optical axis of lens 30 and/or within each region 46 (e.g., as shown by lines 60). This may help to prevent the formation of stray light regardless of the incident direction about the optical axis of lens(es) 30, for example. If desired, regions 46 may be placed at locations that are rotationally symmetric about the Y-axis. In general, regions 46 may have any desired shape. Regions 46 may all have the same shape and size or may, if desired, have different shapes or sizes.

Figure 5:
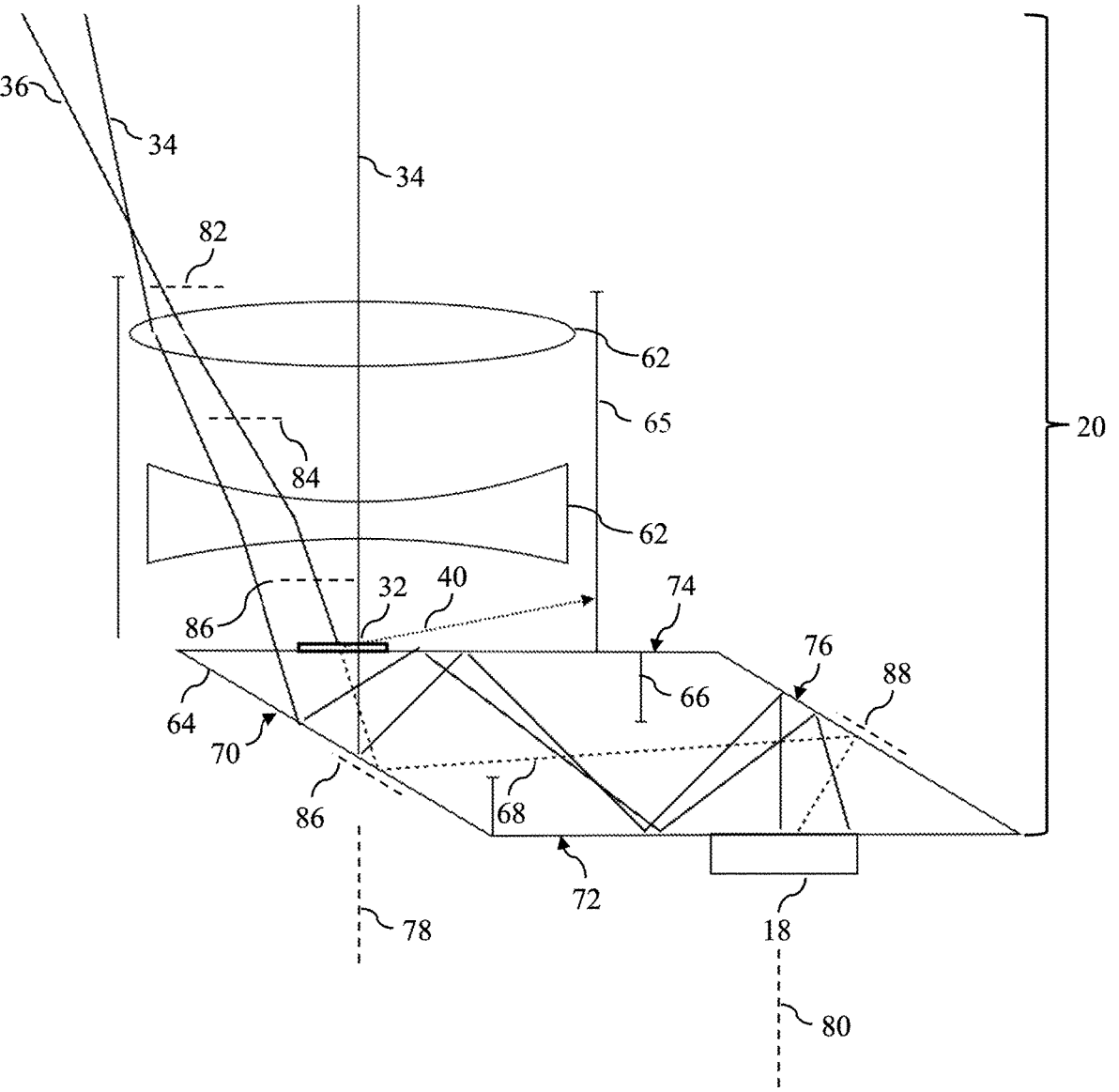
FIG. 5 is a top view of an illustrative optical system that includes a beam-translating prism for directing light towards an optical sensor in accordance with some embodiments.

FIG. 5 is a top view showing one example of an illustrative optical system 20 having DOE 32 for mitigating image sensor artifacts associated with stray light. In the example of FIG. 5, optical system 20 includes a beam-translating prism such as prism 64. Prism 64 may redirect light incident within a signal beam at/around a first axis 78 onto an optical sensor 18 that is located at/around a second axis 80 (e.g., an optical axis of optical sensor 18), where second axis 80 is laterally offset from and optionally parallel to first axis 78.

As shown in FIG. 5, optical system 20 may also include optics such as one or more lens elements 62. If desired, lens elements 62 may be enclosed within a lens housing 65. Lens elements 62 may direct light towards prism 64. Prism 64 may have at least four optical surfaces (faces) 70, 74, 76, and 72. Prism 64 is sometimes also referred to herein as tetraprism 64. Prism 64 may help to redirect light from lens elements 62 (first axis 78) towards optical sensor 18 (second axis 80), allowing optical sensor 18 to be flexibly placed within device 10 while accommodating the presence of other device components (e.g., components that would otherwise prevent light from being directed straight towards optical sensor 18 along second axis 80).

As shown by rays 34, light (e.g., light 24A and/or 24B of FIG. 1) may pass through lens elements 62 towards prism 64. The light is transmitted through surface 74 towards surface 70 (in a first transmission), reflects off of surface 70 (e.g., via TIR) back towards surface 74 (in a first reflection), reflects off surface 74 towards surface 72 (e.g., via TIR in a second reflection), reflects off surface 72 towards surface 76 (e.g., via TIR in a third reflection), reflects off surface 76 towards surface 72 (e.g., via TIR in a fourth reflection), and is transmitted through surface 72 to optical sensor 18 (e.g., in a second transmission). This may allow the light to propagate laterally from around axis 78 to around axis 80.

If care is not taken, the light incident upon lens elements 62 at relatively high angles with respect to the optical axis of lens elements 62 (rays 36) can follow a stray light path 68 through prism 64 and can produce undesirable artifacts at optical sensor 18. To help mitigate these artifacts, one or more baffles 66 may be disposed or embedded within prism 64 to help block these angles of stray light. However, baffles 66 may be insufficient on their own to fully block all angles of stray light, particularly given manufacturing variations and tolerances associated with prism 64 and baffles 66.

To help mitigate these issues, DOE 32 may be disposed at one or more locations within optical system 20 that would otherwise produce stray light artifacts at optical sensor 18. For example, as shown in FIG. 5, DOE 32 may be layered onto a portion of surface 74 that overlaps rays 36. DOE 32 may diffract rays 36 away from prism 64 and/or optical sensor 18 (e.g., towards a baffle, towards a light absorber, towards housing 65, etc.). This may help to prevent the formation of stray light artifacts by optical sensor 18.

The example of FIG. 5 is illustrative and non-limiting. In general, a DOE 32 may be disposed at any desired locations in optical system 20 where rays 36 would otherwise propagate to produce stray light artifacts at optical sensor 18. For example, DOE 32 may be disposed at location 86 on surface 70, at location 88 on surface 76, may be embedded within prism 64, may be disposed on a surface of one or more lens elements 62, may be disposed at an input to housing 65 (e.g., at location 82), may be disposed between lens elements 62 (e.g., at location 84), may be disposed between lens elements 62 and prism 64 (e.g., at location 86), etc.

The examples of FIGS. 1-4 in which light 24 is provided to optical sensor 18 are illustrative and non-limiting. Additionally or alternatively, light 24 may be provided to an eye box of device 10 (e.g., in implementations where device 10 is a head mounted device such as an augmented or virtual reality headset). Put differently, optical sensor 24 may be replaced with an eye box. The user may place their eye at, near, and/or within the eye box to view light 24 while wearing device 10. In these implementations, optical system 20 may include an optical waveguide for directing light from a projector to the eye box.

Figure 6:
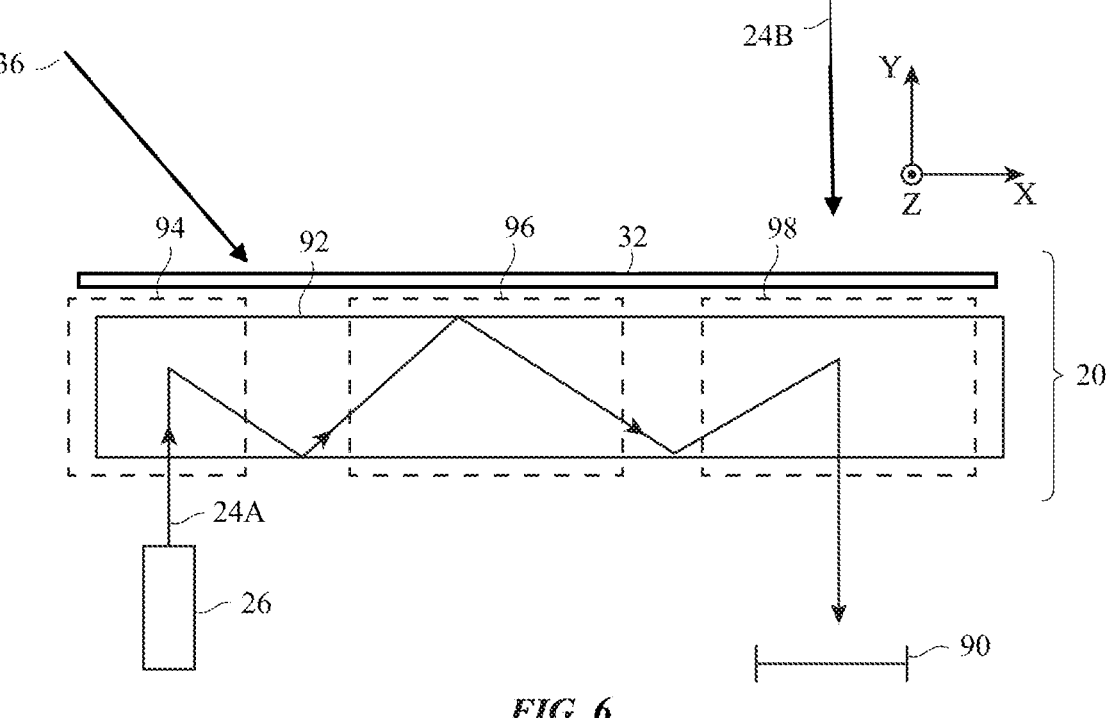
FIG. 6 is a top view of an illustrative optical system having a waveguide for directing image light and world light towards an eye box in accordance with some embodiments.

FIG. 6 is a top view showing one example of how optical system 20 may include an optical waveguide for directing light from a projector to an eye box. In the example of FIG. 6, optical source 26 may include a display projector and is sometimes referred to herein as display projector 26 or display module 26. As shown in FIG. 6, optical system 20 may include optical elements such as one or more waveguides 92. Waveguide 92 may include one or more stacked substrates (e.g., stacked planar and/or curved layers sometimes referred to herein as waveguide substrates) of optically transparent material such as plastic, polymer, glass, etc.

If desired, waveguide 92 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 92 may include holographic phase gratings such as volume holograms or thin-film holograms, meta-gratings, or any other desired diffractive grating structures. The diffractive gratings on waveguide 92 may also include surface relief gratings formed on one or more surfaces of the substrates in waveguides 92, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

As shown in FIG. 6, projector 26 may generate light 24A (sometimes also referred to herein as image light 24A) associated with image content to be displayed at a corresponding eye box 90. Image light 24A may be, for example, light that contains and/or represents something viewable such as a scene or object (e.g., as modulated onto the image light using the image data provided by control circuitry 14 of FIG. 1 to the projector). Image light 24A may, for example, include a stream of image frames (e.g., video data) that contain computer-generated (virtual) objects represented by pixel values in the image frames. Image light 24A may be collimated using a lens if desired (not shown). Optical system 20 may be used to present image light 24A output from projector 26 to eye box 90.

Optical system 20 may include one or more optical couplers such as input coupler 94, cross-coupler 96, and output coupler 98. In the example of FIG. 6, input coupler 94, cross-coupler 96, and output coupler 98 are formed at or on waveguide 92. Input coupler 94, cross-coupler 96, and/or output coupler 98 may be completely embedded within the substrate layers of waveguide 92, may be partially embedded within the substrate layers of waveguide 92, may be mounted to waveguide 92 (e.g., mounted to an exterior surface of waveguide 26), etc.

The example of FIG. 6 is illustrative and non-limiting. One or more of these couplers (e.g., cross-coupler 96) may be omitted. Optical system 20 may include multiple waveguides that are laterally and/or vertically stacked with respect to each other. Each waveguide may include one, two, all, or none of couplers 94, 96, and 98. Waveguide 92 may be at least partially curved or bent if desired.

Waveguide 92 may guide image light 24A down its length via total internal reflection. Input coupler 94 may be configured to couple image light 24A from projector 26 into waveguide 92, whereas output coupler 98 may be configured to couple image light 24A from within waveguide 92 to the exterior of waveguide 92 and towards eye box 90. Input coupler 94 may include an input coupling prism, a surface relief grating, louvered mirrors, an angled edge or face of waveguide 92, volume holograms, metagratings, a reflective layer, and/or other input coupling structures. As an example, projector 26 may emit image light 24A in the +Y direction towards optical system 20. When image light 24A strikes input coupler 94, input coupler 94 may redirect image light 24A so that the light propagates within waveguide 92 via total internal reflection towards output coupler 98 (e.g., in the +X direction). When image light 24A strikes output coupler 98, output coupler 98 may redirect image light 24A out of waveguide 92 towards eye box 90 (e.g., back in the −Y direction). In scenarios where cross-coupler 96 is included at waveguide 92, cross-coupler 96 may redirect image light 24A in one or more directions as it propagates down the length of waveguide 92, for example. Cross-coupler 96 and/or output coupler 98 may perform one or two dimensional pupil expansion upon redirecting image light 24A if desired.

Input coupler 94, cross-coupler 96, and/or output coupler 98 may be based on reflective and refractive optics or may be based on holographic (e.g., diffractive) optics. In arrangements where couplers 94, 96, and 98 are formed from reflective and refractive optics, couplers 94, 96, and 98 may include one or more reflectors (e.g., an array of micromirrors, partial mirrors, louvered mirrors, or other reflectors). In arrangements where couplers 94, 96, and 98 are based on holographic optics, couplers 94, 96, and 98 may include diffractive gratings (e.g., volume holograms, surface relief gratings, etc.).

Projector 26 may include reflective displays (e.g., displays with a light source that produces illumination light that reflects off of a reflective display panel to produce image light, such as liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in projector 26 may include uLEDs, OLEDs, LEDs, lasers, combinations of these, or any other desired light-emitting components.

Optical system 20 may form lenses that allow a viewer (see, e.g., a viewer's eyes at eye box 90) to view images. There may be two optical systems 20 (e.g., for forming left and right lenses) associated with respective left and right eyes of the user. A single display may produce images for both eyes or a pair of displays may be used to display images. In configurations with multiple near-eye displays (e.g., left and right eye displays), the focal length and positions of the lenses formed by components in optical system 20 may be selected so that any gap present between the displays will not be visible to a user (e.g., so that the images of the left and right displays overlap or merge seamlessly).

If desired, optical system 20 may contain components (e.g., an optical combiner, etc.) that allow real-world image light (e.g., light 24B) from real-world images or objects to be combined optically with virtual (computer-generated)

images such as virtual images in image light 24A. In this type of system, which is sometimes referred to as an augmented reality system, a user of system 10 may view both real-world objects and computer-generated content (e.g., virtual objects) that is overlaid on top of the real-world objects. Camera-based augmented reality systems may also be used in device 10 (e.g., in an arrangement in which a camera captures real-world images of object and this content is digitally merged with virtual content at optical system 20).

If care is not taken, as shown by ray 36, high incident angle world light (sometimes also referred to herein as scene light, environmental light, external light, or ambient light) may be incident upon waveguide 92 (e.g., output coupler 98, cross-coupler 96, and/or input coupler 94) at one or more angles that would cause the light to produce, after the light has propagated through optical system 20, stray light artifacts at eye box 90 that can be distracting to a user while the user's eye is at eye box 90. To mitigate this stray light, one or more DOEs 32 may be layered over waveguide 32 (e.g., at the world-facing side of waveguide 32 and/or the user-facing side of waveguide 32). DOE 32 may redirect the light associated with ray 36 back into the environment, towards a baffle, away from eye box 90, etc. DOE 32 may overlap all of waveguide 32 (as shown in the example of FIG. 6), may overlap one or more of input coupler 94, cross-coupler 96, and/or output coupler 98, may overlap only a portion of waveguide 32 that will otherwise produce stray light artifacts at eye box 90, etc. Multiple DOEs 32 may be disposed at different locations in optical system 20 if desired. In this way, DOE 32 may prevent stray light associated with high incident angle world light (e.g., light 24B) from reaching eye box 90 (rather than optical sensor 18 as in FIGS. 1-5).

Figure 7:
FIG. 7 is a top view of an illustrative input coupling prism that may provide light from a projector to a waveguide in accordance with some embodiments.
Figure 7:
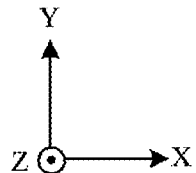
Figure 7:
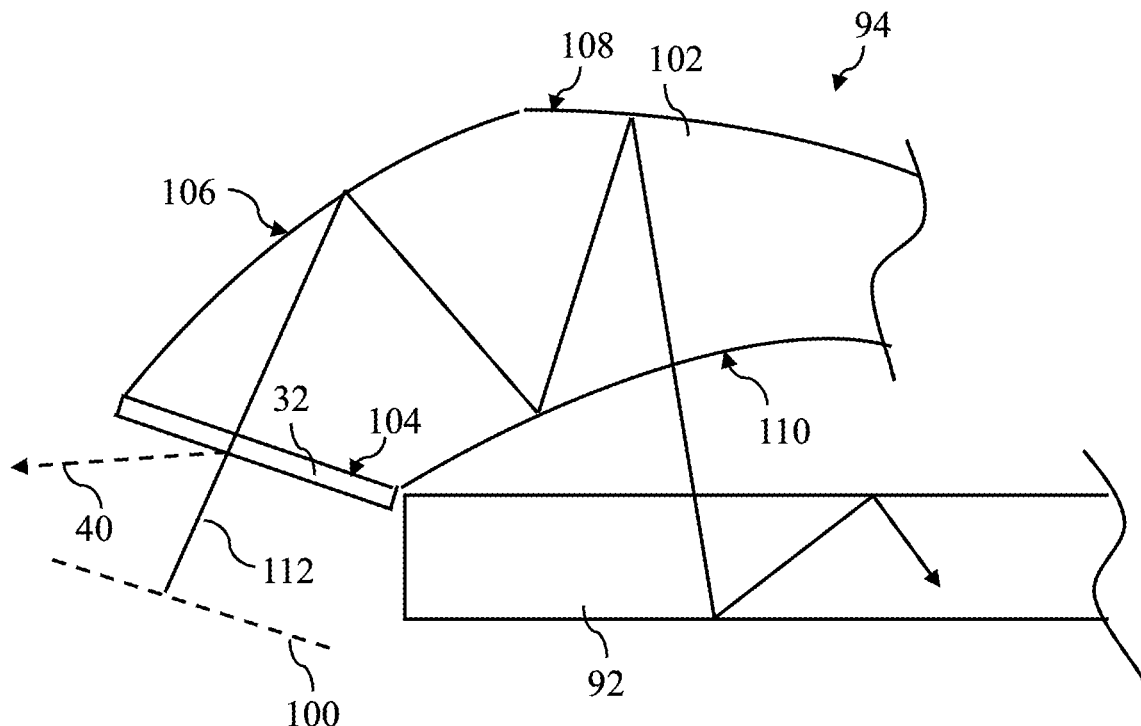

FIG. 7 shows one example of an input coupler 94 that may be used to couple image light 24A into waveguide 92. As shown in FIG. 7, input coupler 94 may include a folded prism 102. Folded prism 102 may include surfaces 104, 106, 102, and 110. As shown by ray 112, image light 24A may be incident upon surface 104 from within pupil 100 of projector 26 (FIG. 6). Surface 104 may transmit the image light towards surface 106, which transmits the light to surface 106, which reflects the light towards surface 110 (e.g., via TIR), which reflects the light towards surface 108 (e.g., via TIR), which reflects the light towards surface 110 (e.g., via TIR), which transmits and couples the light into waveguide 92 within the TIR range of waveguide 92. If desired, one or more of surfaces 104, 106, 108, and 110 may be curved to impart optical power to the image light coupled into waveguide 92.

If care is not taken, some relatively high angles of the light provided to folded prism 102 can produce undesirable stray light artifacts at the eye box. To mitigate these issues, DOE 32 may be layered onto one or more surfaces of folded prism 102 and/or may be disposed within the projector to direct these stray-light producing angles of image light 24A away from the optical path and the eye box (e.g., towards a baffle, absorber, etc.). For example, as shown in FIG. 7, DOE 32 may be layered onto surface 104 and may diffract stray-light producing angles of the incident image light 24A away from the optical path as shown by ray 40. This may, for example, serve to tighten the cone of angles spanned by the beam of image light provided to folded prism 102. DOE 32 may be layered elsewhere if desired (e.g., within folded prism 102, on surface 106, on surface 108, on surface 110, on waveguide 92, within the projector such as between an X-cube and one or more light source panels in the projector, between the projector and surface 104, etc.). Multiple DOEs 32 may be used if desired.

Figure 8A:
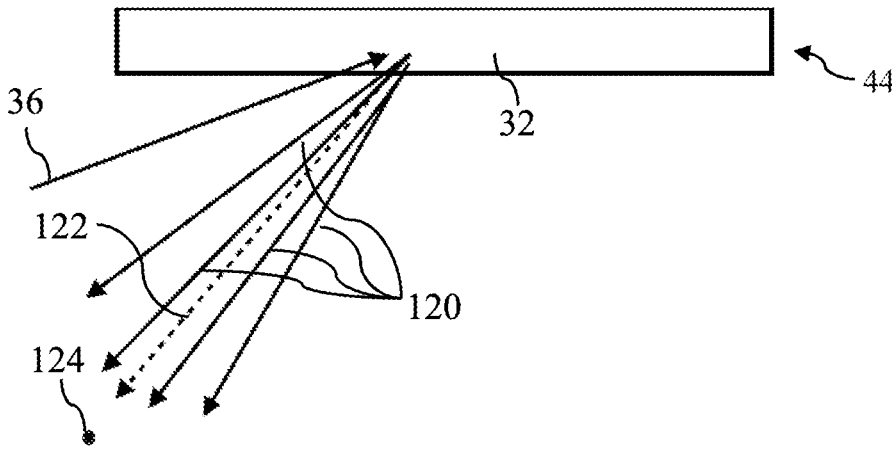
FIGS. 8A-8C are top views of an illustrative diffractive optical elements that diffract light in different directions in accordance with some embodiments.

In the examples of FIGS. 2-7, DOE 32 is illustrated as diffracting light onto a single output angle for the sake of clarity. This is illustrative and non-limiting. FIG. 8A shows another example in which DOE 32 (in any of the embodiments described herein) diffracts light from a single incident angle (ray 36) onto multiple different output (diffracted) angles, as shown by rays 120 around a central ray 122 (rather than onto a single output angle as shown by ray 122). DOE 32 may, for example, include multiplexed holograms in medium 44 that each diffract light from the same incident angle (e.g., ray 36) onto a different respective output angle (e.g., onto a different respective ray 120). Alternatively, DOE 32 may include a diffuser hologram that diffracts light from a single incident angle (ray 36) onto a range of diffused output angles (rays 122). This may help to prevent a bright or distracting visible artifact from being visible from the diffracted light at location 124 (e.g., a location in the world where other user's may be looking at device 10 in implementations where device 10 is an AR headset), by effectively smearing, diffusing, or blurring the diffracted light output by DOE 32.

Figure 8B:
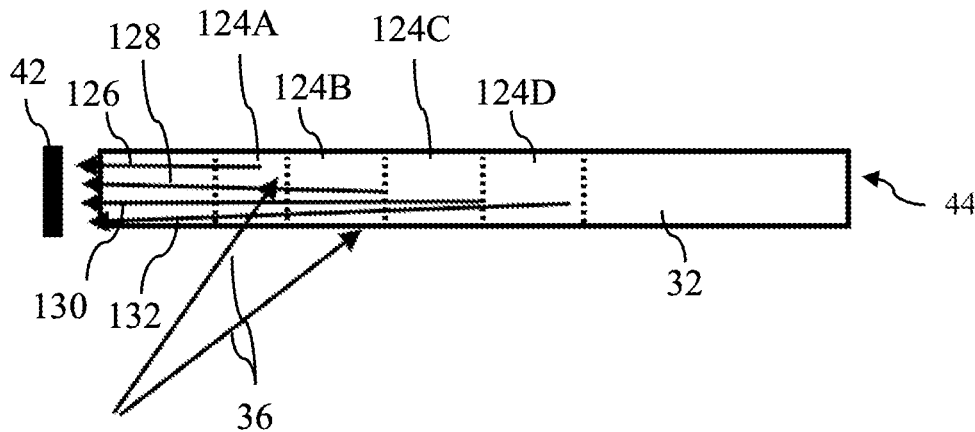

In the example of FIG. 8B, medium 44 is divided into different respective spatial regions 124. Each region 124 may include one or more holograms (gratings) that diffract a different respective incident angle (or range of incident angles) onto a corresponding respective output angle (or range of output angles). If desired, the holograms in each region 124 may be comb-shifted with respect to the holograms in the other regions 124. In the example of FIG. 8B, for instance, DOE 32 includes a first set of one or more holograms in region 124A that diffract light from a first range of incident angles towards optical stop 42 as shown by arrow 126 (e.g., directly or via TIR through medium 44 acting as a waveguide), DOE 32 includes a second set of one or more holograms in region 124B that diffract light from a second range of incident angles towards optical stop 42 as shown by arrow 128 (e.g., directly or via TIR through medium 44 acting as a waveguide), DOE 32 includes a third set of one or more holograms in region 124C that diffract light from a third range of incident angles towards optical stop 42 as shown by arrow 130 (e.g., directly or via TIR through medium 44 acting as a waveguide), and DOE 32 includes a fourth set of one or more holograms in region 124D that diffract light from a second range of incident angles towards optical stop 42 as shown by arrow 132 (e.g., directly or via TIR through medium 44 acting as a waveguide). This may serve to minimize world side artifact visibility in implementations where DOE 32 is layered over waveguide 92 (FIG. 6).

Figure 8C:
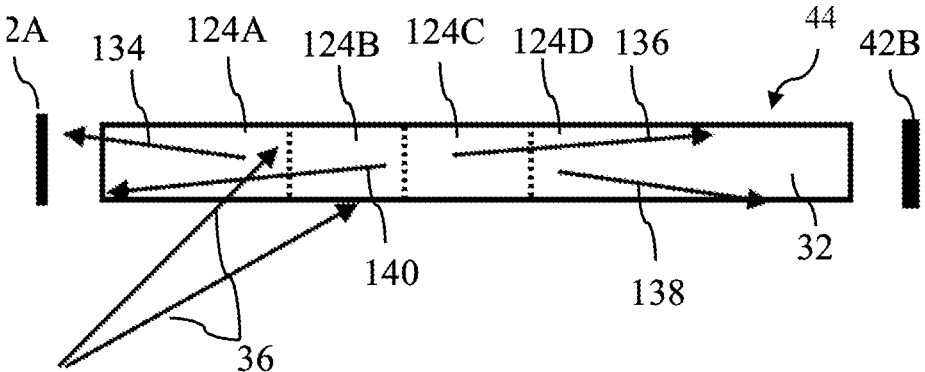

In the example of FIG. 8C, the gratings in different regions 124 direct different respective ranges of incident light onto different optical stops 42 (e.g., in a fan-out configuration). For example, the grating(s) in region 124A may direct a first range of incident light towards optical stop 42A as shown by arrow 134 (e.g., directly or via TIR), the grating(s) in region 124B may direct a second range of incident light towards optical stop 42A as shown by arrow 140 (e.g., directly or via TIR), the grating(s) in region 124C may direct a first range of incident light towards optical stop 42B as shown by arrow 136 (e.g., directly or via TIR), and the grating(s) in region 124A may direct a first range of incident light towards optical stop 42B as shown by arrow 138 (e.g., directly or via TIR).

The foregoing is merely illustrative and various modifications can be made to the described embodiments. The foregoing embodiments may be implemented individually or in any combination.

What is claimed is:

1. An electronic device comprising:
an optical sensor configured to generate sensor data in response to light;
optics configured to transmit the light to the optical sensor;
a medium overlapping the optics; and
a set of holograms in the medium, the set of holograms being configured to
transmit, to the optics, a first portion of the light incident upon the medium from a first range of incident angles, and
diffract, away from the optics, a second portion of the light incident upon the medium from a second range of incident angles that is different from the first range of incident angles, wherein the set of holograms is rotationally symmetric about an optical axis of the optics.

2. The electronic device of claim 1, wherein the optics comprise a lens and the medium is layered onto a surface of the lens.

3. The electronic device of claim 1, further comprising:
a baffle, wherein the set of holograms is configured to diffract the second portion of the light towards the baffle.

4. The electronic device of claim 1, wherein the optics comprise a beam-translating prism, the medium being layered onto a surface of the beam-translating prism.

5. The electronic device of claim 1, wherein the second range of incident angles are greater than the first range of incident angles relative to an optical axis of the optics.

6. The electronic device of claim 1, further comprising:
a display configured to emit the light.

7. The electronic device of claim 1, wherein the set of holograms comprises reflective volume holograms.

8. The electronic device of claim 7, wherein the set of holograms further comprises transmissive volume holograms.

9. The electronic device of claim 8, wherein the transmissive volume holograms are confined to a first portion of a lateral area of the medium and the reflective volume holograms are confined to a second portion of the lateral area of the medium that is different from the first portion of the lateral area of the medium.

10. The electronic device of claim 1, wherein the set of holograms comprises transmissive volume holograms.

11. The electronic device of claim 1, wherein the set of holograms has a diffraction efficiency that varies across a lateral area of the medium.

12. The electronic device of claim 11, wherein the set of holograms is confined to a subset of the lateral area of the medium.

13. The electronic device of claim 1, wherein a first subset of the set of holograms is confined to a first region of a lateral area of the medium, a second subset of the set of holograms is confined to a second region of the lateral area of the medium that is different from the first region of the lateral area, the first subset of the set of holograms is configured to diffract light from a first subset of the second range of incident angles, and the second subset of the set of holograms is configured to diffract light from a second subset of the second range of incident angles that is different from the first subset of the second range of incident angles.

14. The electronic device of claim 13, wherein the first subset of the set of holograms is configured to diffract the light from the first subset of the second range of incident angles in a first direction within a total internal reflection (TIR) range of the medium and wherein the second subset of the set of holograms is configured to diffract the light from the second subset of the second range of incident angles in a second direction within the TIR range of the medium, the second direction being opposite the first direction.

15. The electronic device of claim 1, wherein the set of holograms is configured to diffract the second portion of the light onto an output angle within a total internal reflection (TIR) range of the medium, the medium being configured to propagate, via TIR, the second portion of the light diffracted by the set of holograms.

16. A camera comprising:
an array of image sensor pixels;
a waveguide overlapping the array of image sensor pixels;
holograms on the waveguide, wherein
    the holograms are configured to diffract, onto output angles within a total internal reflection (TIR) range of the waveguide, a first portion of light incident upon the medium layer from a first range of angles, and
    the holograms are configured to transmit a second portion of the light incident upon the medium layer from a second range of angles; and
    a lens configured to direct the second portion of the light onto the array of image sensor pixels, the first range of angles being greater than the second range of angles relative to an optical axis of lens, and the array of image sensor pixels being configured to capture images of the second portion of the light.

17. The camera of claim 16, wherein the holograms comprise volume holograms and are configured to transmit the second portion of the light without diffracting the second portion of the light.

18. An electronic device comprising:
a projector configured to output image light;
a waveguide configured to propagate the image light;
an optical coupler on the waveguide configured to couple the image light out of the waveguide and towards an eye box, the optical coupler being configured to transmit external light towards the eye box and overlaid with the image light;
a medium overlapping the waveguide; and
a set of one or more overlapping holograms in the medium, the set of one or more overlapping holograms being configured to
    transmit, to the waveguide, a first portion of the external light incident upon the medium from a range of incident angles, and
    diffract, onto a range of multiple different output angles oriented away from the waveguide, a single incident angle of the external light, the single incident angle being outside the range of incident angles.

19. The electronic device of claim 18, further comprising:
a folded prism configured to couple the image light into the waveguide, the folded prism being configured to reflect the image light at least three times; and
a diffractive optical element layered onto a surface of the folded prism, the diffractive optical element being configured to diffract, away from the waveguide, a range of incident angles of the image light exceeding a threshold incident angle.

* * * * *